United States Patent [19]
Noggle et al.

[11] Patent Number: 6,019,929
[45] Date of Patent: Feb. 1, 2000

[54] MOLD SHUTTLE SYSTEM, APPARATUS, AND METHOD

[76] Inventors: Michael K. Noggle; Truman J. Stegmaier, both of 6125 W. Sam Houston Pkwy. N., Houston, Tex. 77041

[21] Appl. No.: 08/992,165

[22] Filed: Dec. 17, 1997

[51] Int. Cl.$^7$ .............................. B29C 33/30; B29C 33/34
[52] U.S. Cl. ................... 264/297.2; 264/328.1; 264/328.8; 264/328.11; 425/183; 425/186; 425/195; 425/575
[58] Field of Search .................. 264/40.1, 328.1, 264/297.2, 297.6, 297.7, 328.8, 297.3, 328.11; 425/183, 185, 186, 193, 195, 588, 575, 261, 345

[56] References Cited

U.S. PATENT DOCUMENTS

| | | | |
|---|---|---|---|
| 1,740,082 | 12/1929 | Foerstner | 264/297.2 |
| 4,073,855 | 2/1978 | Kamerling et al. | 264/297.6 |
| 4,439,123 | 3/1984 | Sano et al. | 425/183 |
| 5,053,173 | 10/1991 | Sticht | 264/297.2 |
| 5,183,605 | 2/1993 | Brown et al. | 264/40.5 |
| 5,318,435 | 6/1994 | Brown et al. | |
| 5,320,511 | 6/1994 | Woerner | 264/297.2 |
| 5,368,793 | 11/1994 | Lau | 264/297.2 |
| 5,830,390 | 11/1998 | Brown et al. | 264/297.6 |

FOREIGN PATENT DOCUMENTS

| | | |
|---|---|---|
| 57-77542 | 5/1992 | Japan . |
| 58-208027 | 12/1993 | Japan . |

OTHER PUBLICATIONS

Auto Injectors Inc., Series 90 Insert Injection Molding Machines, Flyer, 1994, Albion, IN.

*Primary Examiner*—Jill L. Heitbrink
*Attorney, Agent, or Firm*—Jeffrey E. Griffin

[57] ABSTRACT

A shuttle system for a vertical injection molding machine provides two carrier members slidably mounted to the upper surface of a platform of the vertical injection molding machine. A detent attached to the bottom of each of the carrier members mates with a slot associated with each of the carrier members to restrict the motion of the carrier member and define the travel path of the carrier member. The travel paths lie at an angle to one another and deliver the carrier members between a common aligned position and separate offset positions. The aligned position is the position of the carrier member in which a lower mold half attached to the carrier member is aligned with the upper mold half for completion of the mold and injection. The offset positions are nearer the front side of the vertical injection molding machine than the aligned position so that the carrier members move toward the front side between injection cycles. Each of the carrier members is attached to a separate hydraulic cylinder that independently moves the carrier members between the aligned and offset positions.

24 Claims, 4 Drawing Sheets

MOLD SHUTTLE SYSTEM, APPARATUS, AND METHOD

BACKGROUND OF THE INVENTION

1. Field of Invention

The present invention relates to the field of vertical injection molding machines. More specifically, the invention relates to a mold shuttle system that independently moves a pair of lower mold halves sequentially between an indexed position and an offset position that is near the operator reducing the time between injection cycles and increasing throughput.

2. Related Art

A vertical injection molding machine uses a mold, typically formed of an upper mold half and a lower mold half, that when clamped together form a mold cavity. When an injection molding machine is used in an insert molding procedure, the sides of the mold are to initially separated to allow placement of the inserts in the mold. The mold halves are then clamped together in the vertical injection molding machine. An injection nozzle of the machine engages the mold and injects the material such as plastic into the mold cavity through an injection passageway provided in the mold. The material flows into the mold cavity and hardens forming the part. The halves of the mold are separated and the part is removed from the mold cavity. Typically, one of the mold sides is movable vertically to open the mold and provide for the removal of the molded part between injection cycles. Although either the upper mold half or lower mold half may move, the present application will focus on a machine in which the upper mold half moves vertically to engage the lower mold half of the mold.

During the molding procedure, the typical vertical injection molding machine is idle between injection cycles while the part is removed from the mold cavity and the mold is prepared for the next injection cycle by placing the required inserts in the mold. The longer the time between injection cycles, the lower the throughput and the less efficient the machine.

One manner of reducing the idle time and increasing the throughput is to incorporate a shuttle system into the vertical injection molding machine. Typical shuttle systems are one of two types, a rotary table or a side-to-side shuttle system. In the rotary table shuttle system, two or more lower mold halves of the mold are equally spaced about and are attached to a table of the injection molding machine. The table rotates to sequentially index the lower mold halves beneath the upper mold half for injection. Thus, while one of the lower mold halves, the indexed lower mold half, is beneath the upper mold half, the injection molding machine can clamp the upper mold half to the indexed lower mold half and complete the injection cycle on the completed mold. At the same time, the other lower mold halves are offset from the indexed position and are therefore available for the operator or operator robot to remove the formed part from the mold cavity and prepare the mold for injection. Thus, by adding lower mold halves that are sequentially indexed for injection, the rotary table shuttle system increases the throughput through the system.

One problem associated with rotary table systems is that they are relatively large and require a larger mounting area. Additionally, most of the machines incorporating a rotary system are adapted to use at least four lower mold halves. This requires the construction of four relatively expensive lower mold halves, increasing the tooling costs for each part made using the machine.

In injection molding machines incorporating a side-to-side shuttle systems, the machine has a table that slides side-to-side beneath the injection assembly and the upper mold half. A pair of lower mold halves mounted to the table move with the table. The table slides alternately from one side to the other to sequentially index each of the lower mold halves beneath the upper mold half where the aligned halves are clamped and the injection cycle is completed. During the injection cycle, an operator or robot can access the lower mold half that is offset from the indexed position, remove the part from the mold, and prepare the mold for injection.

However, because the table slides side-to-side, the operator must walk from one side of the table to the other to access the lower mold half that is offset from the injection assembly. The distance between the two positions where the operator can access the lower mold halves is typically about four feet. Often the cycle for preparing a mold, moving the mold into position, injecting the material into the mold, moving the mold to the offset position and removing the completed part is only about ten to fifteen seconds. Therefore, the four foot distance between offset positions is relatively far considering that the operator must walk the distance every cycle. Any delay by the operator reduces the machine's throughput. Although robots can be used to perform some of the preparatory and part removal functions, the side-to-side shuttle system typically requires the use of two robots, one on each side of the injection molding machine.

Additionally, neither the rotary system nor the side-to-side system allows for independent control of individual lower mold halves. Therefore, any damage to or required maintenance on one of the lower mold halves requires that the complete machine be shut down for repair or maintenance.

Thus, despite the use of the prior art features, there remains a need for a shuttle system that increases the throughput of an injection molding machine, that reduces the distance between offset positions, and that provides for independent control of the lower mold halves allowing maintenance to be performed on one while the machine continues to operate with the other lower mold half.

SUMMARY OF THE INVENTION

Accordingly, the objectives of the present invention are to provide, inter alia, a mold shuttle system, apparatus, and method that:

- provides a shuttle system for an injection molding machine;
- allows for independent control of the lower mold halves;
- allows repair, maintenance, and tool change-out while continuing to operate;
- moves the lower mold halves along independent travel paths in a direction toward the front end of the vertical injection molding machine;
- reduces the distance that an operator must travel between injection cycles;
- permits the use of a single robot, with the shuttle system, that has access to both lower mold halves;
- increases the throughput through the vertical injection molding machine while reducing costs; and
- is relatively low in cost and easy to implement and maintain.

Other objects of the invention will become apparent from time to time throughout the specification and claims as hereinafter related.

To achieve such improvements, the present invention provides a shuttle system for a vertical injection molding machine that provides for independent indexing of the lower mold halves and that moves the lower mold halves toward the front side of the vertical injection molding machine between injection cycles. Generally, the shuttle system uses a pair of independently controlled carrier members to which the lower mold halves are attached. Each of the carrier members moves along a separate travel path between an indexed, or aligned, position and an offset position that is removed from the aligned position. When in the aligned position, the lower mold half is positioned for mating abutment with the upper mold half to form the mold. The offset position is located nearer the front side of the vertical injection molding machine, closer to the operator. By moving the offset positions of each of the travel paths closer to the front side of the vertical injection molding machine, the horizontal distance between the offset positions may be reduced reducing the distance that the operator must travel to attend to each of the lower mold halves.

In one aspect, the present invention provides a shuttle system apparatus for a vertical injection molding machine. The vertical injection molding machine includes an injection assembly and a mold that has an upper mold half aligned with the injection assembly for operable mating therewith. Also, the upper mold half is adapted for removable, operable mating with an aligned lower mold half of the mold. A plurality of carrier members are attached to the vertical injection molding machine, each of the plurality of carrier members are adapted for removable receipt and attachment of a lower mold half of the mold thereto. The plurality of carrier members are selectively movable in a platform plane between an aligned position, wherein the lower mold half is aligned with the upper mold half, and an offset position removed from the aligned position. The plurality of carrier members are movable relative to one another in the platform plane. Further, the vertical injection molding machine preferably includes a control member in communication with the vertical injection molding machine that is adapted to independently control the motion of each of the carrier members. Each of the carrier members follows a different, independent travel path that is not in the same vertical plane (a vertical plane being a plane perpendicular to a plane defined by the supporting surface, such as the floor) and that is not aligned with the travel paths of the other carrier members. Thus, the travel paths do not follow and the carrier members cannot travel along the same vector. The travel paths preferably lie at an angle to one another and form an angle therebetween that is less than 180 degrees. However, the travel paths may alternatively follow non-linear travel paths that may be arcuate, S-shaped, curvilinear, or otherwise shaped.

The vertical injection molding machine includes a platform attached to its frame and positioned below the upper mold half. The platform has a relatively flat upper surface and the carrier members are slidably attached to the upper surface. Preferably, the upper surface of the platform defines a slot associated with each of the carrier members. A detent attached to each of the carrier members is sized and adapted to mate with the associated slot. Thus, the detents and slots are adapted to restrict the movement of the carrier members to predefined travel paths with each of the slots defining a travel path for the associated carrier member. Preferably, the detents and the slots are T-shaped.

An actuating member attached to each of the plurality of carrier members is adapted to move the plurality of carrier members between the aligned position and the offset position. The actuating member may be a hydraulic or pneumatic cylinder, and worm gear, a linear motor, or any other apparatus capable of moving the carrier members.

In a further aspect of the invention the carrier members are adapted for receipt and attachment of a plurality of lower mold halves thereto.

The invention also provides a the shuttle system for the vertical injection molding machine that uses a plurality of lower mold halves of the mold, each attached to a carrier member. The vertical injection molding machine has one or more carrier members movably attached thereto. Each of the one or more carrier members is adapted for receipt and attachment of at least one of the plurality of lower mold halves and is adapted to selectively move the lower mold halves attached thereto between an aligned position and an offset position. The offset position is located nearer the front side of the vertical injection molding machine than the aligned position and the plurality of lower mold halves follow noncircular travel paths. In one alternative embodiment, the vertical injection molding machine has only one carrier member movably attached thereto. The carrier member is adapted for removable receipt and attachment of two of the lower mold halves of the mold thereto and is adapted to alternately move each of the two lower mold halves between the aligned position and the offset position.

An additional aspect of the invention is a vertical injection molding machine. The vertical injection molding machine includes a frame, a material supply, and an injection assembly attached to the frame. The material supply is in fluid communication with the injection assembly and is adapted to supply material thereto. An upper mold half is attached to the injection assembly and defines an upper mold half cavity that is in fluid communication with the injection assembly. A platform attached to the frame is positioned below the upper mold half and has a relatively flat upper surface that defines a platform plane. A plurality of carrier members are slidably attached to the upper surface of the platform and move relative to one another and relative to the platform. The carrier members are each adapted for receipt and attachment of a lower mold half thereto. Each of the lower mold halves define a lower mold half cavity. The plurality of carrier members are movable between an aligned position, wherein the lower mold half is aligned with the upper mold half, and an offset position removed from the aligned position. The upper mold half is selectively movable vertically between a raised position and a clamped position wherein the upper mold half abuts the lower mold half located in the aligned position. So that, the upper mold half and the lower mold half form a mold and the upper mold half cavity and the lower mold half cavity define a mold cavity in fluid communication with the injection assembly.

The present invention also provides a method for increasing the throughput of a vertical injection molding machine. The method includes the steps of attaching a first lower mold half to a first carrier member that is movably attached to the vertical injection molding machine and attaching a second lower mold half to a second carrier member that is movably attached to the vertical injection molding machine, moving the first carrier member along a first travel path to an aligned position, wherein the first lower mold half is aligned with the upper mold half for mating therewith, then clamping the upper mold half to the first lower mold half, injecting a material into the mold, and separating the mold, and subsequently moving the first carrier member back along the first travel path from the aligned position to an offset position removed from the aligned position, moving the second carrier member, independent from the first carrier member, along a second travel path to the aligned position, the second travel path different from and not aligned with the first travel path, and clamping the upper mold half to the second lower mold half, injecting a material into the mold, and separating the mold.

BRIEF DESCRIPTION OF THE DRAWINGS

The manner in which these objectives and other desirable characteristics can be obtained is explained in the following description and attached drawings in which.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention generally provides a shuttle system 11 for a vertical injection molding machine 10 that provides for independent indexing of the lower mold halves 36 and that moves the lower mold halves 36 toward the front side 18 of the vertical injection molding machine 10 between injection cycles. Generally, the shuttle system 11 uses a pair of independently controlled carrier members 50 to which the lower mold halves 36 are attached. Each of the carrier members 50 moves along a separate travel path between an indexed, or aligned, position and an offset position that is removed from the aligned position. When in the aligned position, the lower mold half 36 is positioned for mating abutment with the upper mold half 34 to form the mold 30. The offset position is located nearer the front side 18 of the vertical injection molding machine 10, closer to the operator. By moving the offset positions of each of the travel paths closer to the front side 18 of the vertical injection molding machine 10, the horizontal distance between the offset positions may be reduced reducing the distance that the operator must travel to attend to each of the lower mold halves 36. In the present invention, the offset positions are located close enough to one another that the operator may access both offset positions from a stationary, seated position, an option not available with current designs.

Although the present application refers to the shuttle system 11 as applied to a vertical injection molding machine 10, the shuttle system 11 may be useful on other types of molding machines and other machines requiring periodic replacement of a component. Also, although vertical injection molding machines 10 may provide for raising of the lower mold half 36 to abutting engagement with a fixed lower mold half 36 and the present invention is applicable to such a machine, for convenience and clarity, the present application refers to a vertical injection molding machine 10 in which the upper mold half 34 is lowered to the lower mold half 36.

Figure 1:
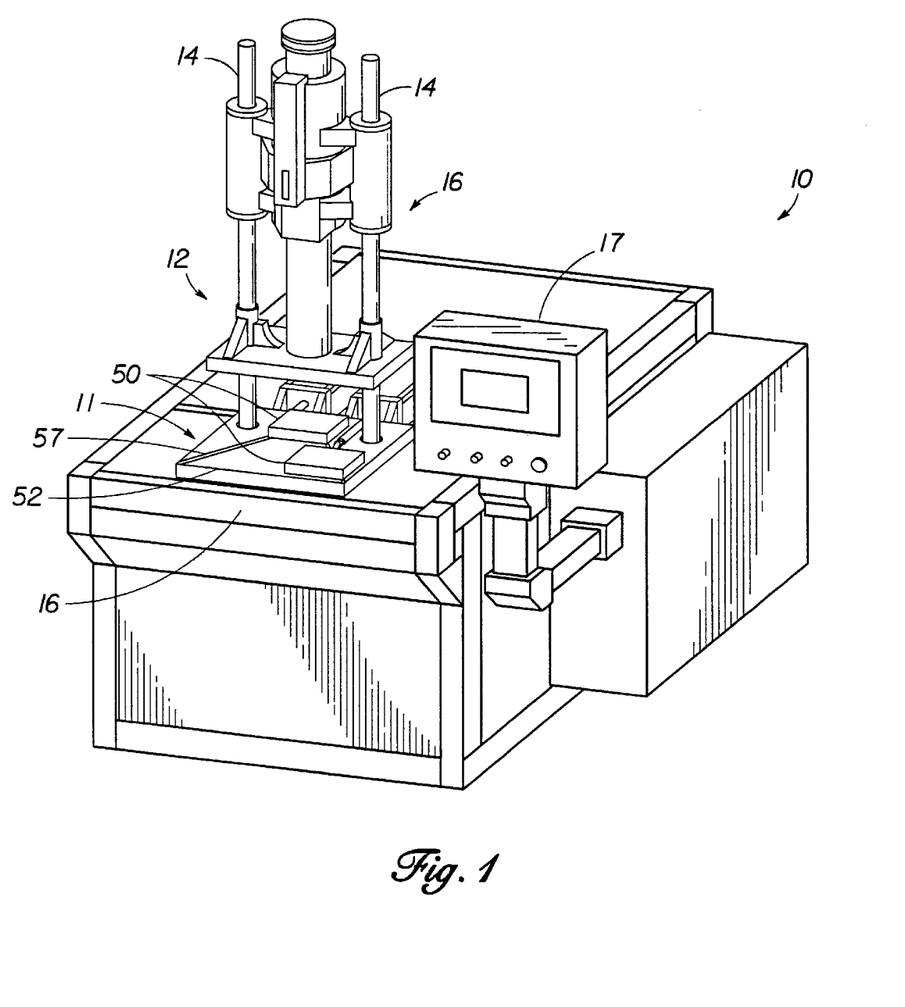
FIG. 1 is a perspective view of the vertical injection molding machine.

FIG. 1 is a perspective view of a vertical injection molding machine 10 incorporating the present invention. In general, a vertical injection molding machine 10 includes a frame 12 that includes a pair of vertically extending support members 14 to which an injection assembly 16 is mounted. The injection assembly 16 is movable vertically along the support members 14 and includes an actuating member 60, such as a stepper motor, that provides for the movement of the injection assembly 16 along the support members 14. The injection assembly 16 is in fluid communication with a material supply that holds and supplies a material, such as plastic, to the injection assembly 16. The material flows through the injection assembly 16 to an injection nozzle 19 positioned centrally at the bottom of the injection assembly 16. The injection nozzle 19 is adapted to mate with a matching injection plate 20 (see FIG. 2) mounted to the top of the mold. The injection plate 20 has a passageway 22 therethrough that communicates the injection material from the injection nozzle 19 into the mold 30.

Figure 2:
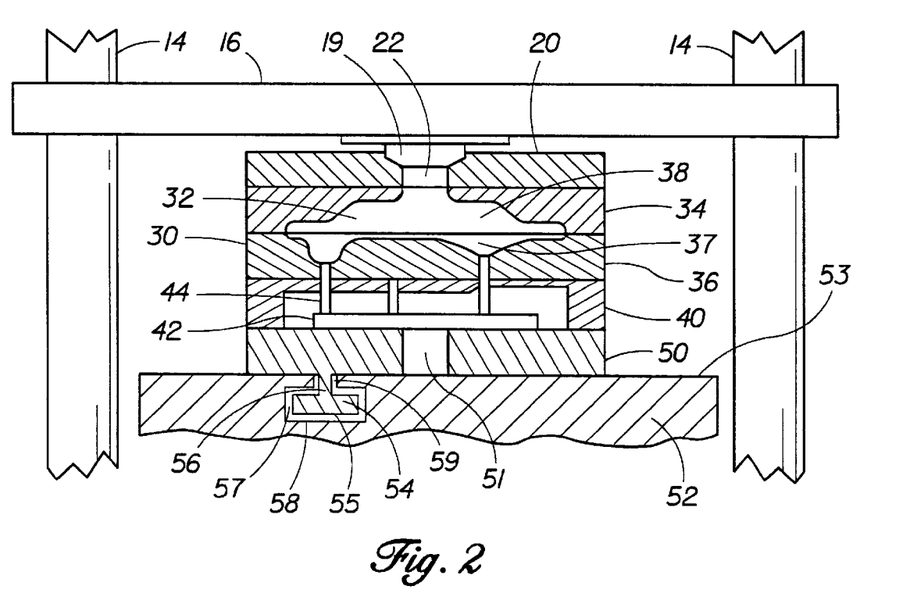
FIG. 2 is a side elevational cross sectional view of the mold during injection showing the different components of the mold.

The mold 30 defines a mold cavity 32 that defines the shape of the part to be molded. An upper mold half 34, or 'A' side, and a lower mold half 36, or 'B' side, are separable along a dividing line to allow removal of the formed part from the mold cavity 32 and, for parts that require inserts, to allow the placement of the inserts in the mold cavity 32 prior to molding. Typically, the lower mold half 36 forms a portion of the mold cavity 32, the lower mold half cavity 37, and the upper mold half 34 defines a portion of the mold cavity 32, the upper mold half cavity 38. The lower mold half 36 typically includes at least one ejector hole 39 extending upward from the bottom that allows an ejector pin 44, or pins, to extend therethrough once the mold 30 is open (the mold halves are separated) and push the formed part from the mold cavity 32 facilitating removal of the formed part.

One apparatus used to facilitate the standardization of the ejection mechanism is an ejector housing 40. When an ejector housing 40 is used, the lower mold half 36 mounts to the top of the ejector housing 40. The ejector housing 40 houses an ejector assembly 42 that includes one or more ejector pins 44 selectively positioned to best force the particular part from the mold cavity 32. An ejector rod (not shown) mounted at the bottom of the vertical injection molding machine 10 is movable vertically through a passageway in the platform 52 of the vertical injection molding machine 10 to contact a base of the ejector assembly 42 and move the ejector assembly 42 vertically upward. Although the present invention often discusses attachment of the lower mold housing to a carrier member 50, it is anticipated that other ancillary components, such as an ejector housing 40, may be positioned between the lower mold half 36 and the carrier member 50. Similarly, the present invention discusses the upper mold half 34 to the injection assembly 16, it is anticipated that other, ancillary components, such as an injection plate 20 may be positioned therebetween.

The upper mold half 34 is attached to and moves vertically with the injection assembly 16. The vertical injection molding machine 10 moves the upper mold half 34 between a raised position and a clamped position. In the raised position, the upper mold half 34 is separated from the lower mold half 36 and is supported above the platform 52 of the vertical injection molding machine 10. Whereas, in the clamped position, the upper mold half 34 is lowered into mating abutment with the lower mold half 36 to complete the mold 30.

A control member 17, typically a computer, of the vertical injection molding machine 10 communicates with the various components of the machine and controls their movement and operation. The control member 17 is preprogrammed to move the various components of the vertical injection molding machine 10 in the appropriate sequence to complete the formation of the part. For example, by providing the appropriate instruction, the control member 17 moves the injection assembly 16 down, lowering the upper mold half 34 to the clamped position, and instructs the injection assembly 16 to inject the material into the mold cavity 32. Once the part is formed, the control member 17 instructs the injection assembly 16 to move up at the appropriate time, raising the upper mold half 34 to the raised position, opening the mold 30, allowing removal of the formed part and insertion of the inserts into the mold cavity 32.

At least one, but preferably a plurality, of carrier members 50 are mounted to the vertical injection molding machine 10 and are selectively movable between an aligned position and an offset position. When the carrier member 50 is in the aligned position, the lower mold half 36 attached to the carrier member 50 is aligned with the upper mold half 34 so that when the upper mold half 34 is lowered to the clamped position the upper mold half 34 and the lower mold half 36 in the aligned position properly abut one another to complete and form the mold 30. The offset position is a position removed from the aligned position. The offset position must be sufficiently spaced from the aligned position that a separate carrier member 50 may move to the aligned position while the other carrier members 50 are in their respective offset positions.

Figure 3:
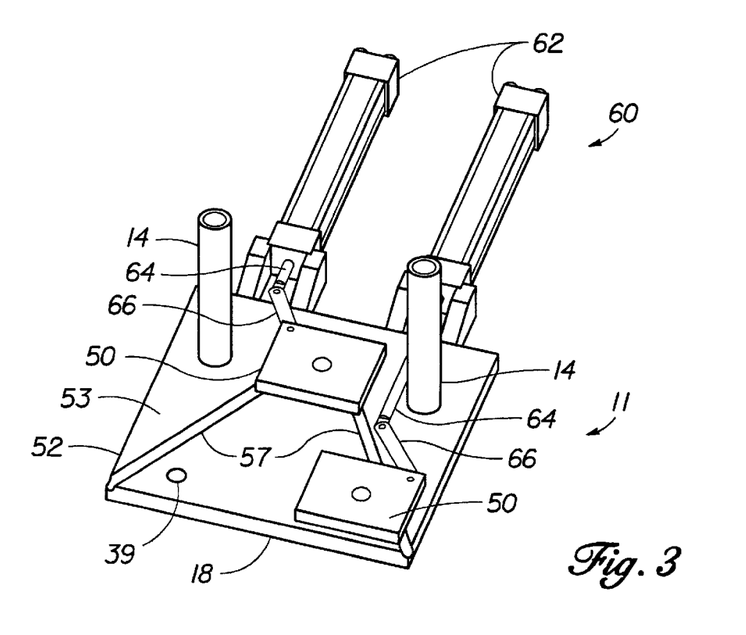
FIG. 3 is a partial perspective view of the shuttle system.

FIG. 3 is a partial perspective view of the shuttle system 11. The vertical injection molding machine 10 includes a platform 52 mounted to the frame 12 below the injection assembly 16. The platform 52 has a substantially flat upper surface 53 that defines a platform plane which typically lies in a horizontal plane (i.e. parallel to a plane defined by the supporting surface, such as the floor).

The preferred embodiment includes two carrier members 50 slidably mounted to the upper surface 53 of the platform 52. Each carrier member 50 is adapted for removable receipt and attachment of a lower mold half 36 to the top of the carrier member 50. Although any standard attachment means may be used, the lower mold half 36 is typically attached to the carrier member 50 using pins, screws, and/or bolts. Once attached, the lower mold half 36 moves with the carrier member 50, but not relative thereto. Further, each of the carrier members 50 typically includes a vertical passageway 51 therethrough to provide an ejector rod access through the vertical passageway 51 to an ejector housing 40 mounted to the carrier member 50.

Each of the carrier members 50 is coupled to the upper surface 53 of the platform 52 by a detent 54 (or detents 54) attached to the bottom of the carrier member 50. The upper surface 53 of the platform 52 defines two slots 57 therein, one associated with each of the carrier members 50. The detent 54 is sized and adapted to mate with the associated slot 57. Preferably, as shown in FIG. 2, the slots 57 and detents 54 are T-shaped with the horizontal portion of the 'T' positioned distal the upper surface 53 of the platform 52 and the bottom of the carrier member 50. Thus, the T-shape prevents the carrier member 50 from moving vertically relative to the upper surface 53 of the platform 52. Other, similarly shaped detents 54 and slots 57 that have a bottom, 55 and 58 respectively, the end distal the upper surface 53 of the platform 52, that is wider than the top, 56 and 59 respectively, the end at the upper surface 53 of the platform 52, such as a triangular shape are equally suitable. The tolerance between the detent 54 and the slot 57 must be sufficiently tight to prevent relative vertical movement thereof in particular, the bottom 55 of the detent 54 is wider than the top 59 of the slot 57 to ensure that the carrier member 50 is prevented from moving vertically (if desired).

Accordingly, the detents 54 and slots 57 restrict the movement of the carrier members 50 along the upper surface 53 of the platform 52. The slots 57 are elongated and each defines a travel path that extends between a position proximal the aligned position to a position proximal the offset position so that the carrier member 50 may move between the aligned and offset positions.

Although the detent 54 may be circular, and thereby allow the carrier member 50 to rotate in the slot 57 when only a single detent 54 is used, the detent 54 is preferably elongated and prevents the carrier member 50 from rotating relative to the slot 57. Preventing the relative rotation of the carrier member 50 to the slot 57 helps ensure that the carrier member 50 is properly oriented when in the aligned position. However, the use of nonlinear slots 57 may preclude the use of elongated detents 54. The detents 54 may include rollers thereon to enhance ease of movement.

Figure 4:
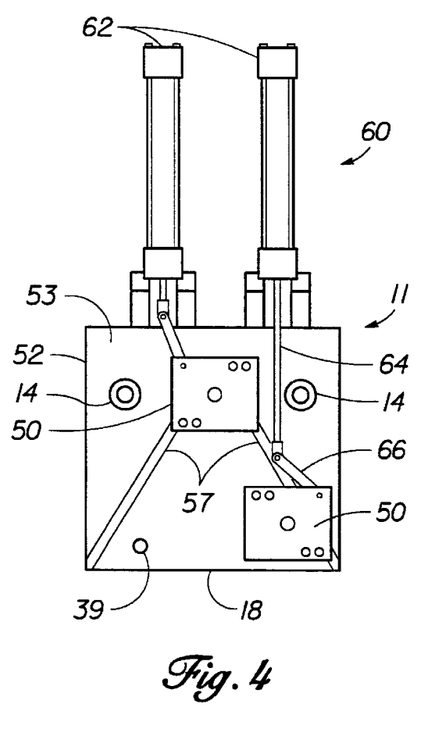
FIG. 4 is a partial top elevational view of the shuttle system.

Preferably, the slots 57 define linear travel paths, as shown in FIG. 4, for the carrier members 50 and are themselves linear. The slots 57 extend from the aligned position at an angle to one another that is less than 180 degrees so that the offset positions associated with each of the carrier members 50 is closer to the front side 18 of the vertical injection molding machine 10 than the aligned position. Thus, as the carrier members 50 move from the aligned position to the offset position, the carrier members 50 move toward the front side 18 of the machine and toward an operator or a robot positioned in front of the machine. Accordingly, the travel paths are not aligned, do not follow the same vectors, and do not lie in the same vertical plane. As the carrier members 50 are each separate components from one another, they cannot follow the same travel path and the travel paths must provide sufficient clearance for the carrier members 50 to move along their respective travel paths.

In the preferred embodiment, the slots 57 are spaced from one another. Thus, to allow the carrier members 50 to move to the aligned position, the detents 54 are offset from the center of the carrier members 50. Because, if the detents 54 on both of the carrier members 50 are centered on the carrier members 50, either (1) the slots 57 have to meet at the center of the aligned position or (2) the lower mold halves 36 must mount to the carrier members 50 at a position offset from the center of the carrier members 50. Accordingly, the detent 54 on the carrier member 50 located proximal the left side of the vertical injection molding machine 10 is positioned to the left of the center of the carrier member 50 and the detent 54 on the carrier member 50 located proximal the right side of the vertical injection molding machine 10 is positioned to the right of the center of the carrier member 50.

A pair of actuating members 60 are attached to the carrier members 50 and are adapted to move the carrier members 50 between the aligned position and the offset position. Each actuating member 60 moves one of the carrier members 50. The actuating member 60 may be any apparatus capable of producing the required motion of the carrier member 50. The preferred embodiment, shown in FIGS. 3 and 4, uses a pair of hydraulic cylinders 62 (although pneumatic cylinders may also be used) mounted to the vertical injection molding machine 10 at its back side. FIG. 4 is a top cross sectional elevational view of the vertical injection molding machine 10 showing the carrier members 50 on the platform 52 and the hydraulic cylinders 62 mounted to the back side of the vertical injection molding machine 10. The movable rams 64 of the hydraulic cylinders 62 are directed toward the carrier members 50 and the front side 18 of the vertical injection molding machine 10 so that they move toward and away from the front side 18. A rigid linkage 66 is rotatably connected, such as by a pin connection, to the apogee end of the ram 64 at one end and to the carrier member 50 at the other end and allows the carrier member 50 to move at an angle to the direction of motion of the ram 64. Accordingly, outward motion of the ram 64 toward the front side 18 of the vertical injection molding machine 10 moves the carrier member 50 toward the offset position and inward motion of the ram 64 moves the carrier member 50 toward the aligned position. The control member 17 communicates with the actuating member 60 to control the motion of the carrier members 50.

Operationally, the preferred embodiment of the shuttle system 11 works as follows. With one carrier member 50 in the aligned position and one in the offset position, the aligned lower mold half 36 is positioned below the upper mold half 34. The injection assembly 16 moves downward along the support members 14 lowering the upper mold half 34 from the raised position to the clamped position into mating abutment with the aligned lower mold half 36 to complete the mold 30. The material flows from the material supply, through the injection assembly 16, through the injection nozzle 19, and into the mold cavity 32 forming the part. Next, the injection assembly 16 moves upward along the support members 14 separating the mold 30 and raising the upper mold half 34 from the clamped position to the raised position. The ram 64 of the hydraulic cylinder 62 attached to the aligned carrier member 50 by a linkage 66 extends outward toward the front side 18 of the vertical injection molding machine 10 moving the carrier member 50 along a linear travel path from the aligned position toward the front side 18 of the vertical injection molding machine 10 to the offset position proximal the front side 18. The elongated, T-shaped detent 54 extending from the bottom of the carrier member 50 mates with the associated slot 57 to move the carrier member 50 along the linear travel path defined by the slot 57 and prevents the carrier member 50 from rotating. While the previously mentioned carrier member 50 moves to the offset position, the second carrier member 50 is moved from its offset position along the linear travel path defined by its associated slot 57 to the aligned position by the attached ram 64 of the associated hydraulic cylinder 62 which retracts and moves toward the back side of the vertical injection molding machine 10. The location of the travel paths, defined by the slots 57 and detents 54, and the timing of the movement of the carrier members 50, which is controlled by the control member 17, ensures that the carrier members 50 to not collide with one another while making their respective movements. The injection sequence is then performed using the second carrier member 50 positioned in the aligned position.

While the injection sequence is performed on the aligned lower mold half 36, the formed part is removed from the offset lower mold half 36 and the offset lower mold half 36 is prepared for a subsequent injection sequence. The ejector rod extends upward through the vertical passageway 51 in the offset carrier member 50 contacting the ejector assembly 42 in the ejector housing 40 and forcing the ejector pins 44 upward. The ejector pins 44 engage the formed part forcing the part away from the lower mold half 36 facilitating removal of the part. Then, the ejector rod retracts lowering the ejector pins 44 from the lower mold half cavity 37. The operator (or robot) removes the part from the lower mold half 36 and, if necessary, places any required inserts in the lower mold half 36. The process is then repeated.

As previously mentioned, prior shuttle systems typically move the table (the platform 52 in the present invention) side-to-side so that the travel paths of the lower mold halves 36 are aligned and are in the same vertical plane (a vertical plane being a plane perpendicular to a plane defined by the supporting surface, such as the floor). Thus, the travel paths are directed along and the lower mold halves 36 travel along the same vectors. This motion requires the operator to move from one side of the vertical injection molding machine 10 (one offset position) to the other (the other offset position) to remove the part and prepare the lower mold half 36 for injection. In a side-to-side shuttle system 11, the distance between the offset positions is equal to twice the distance of travel from the aligned position to the offset position and is typically about four feet. When robots are used with a side-to-side shuttle system 11, two robots must be employed, one on each side. Additionally, by moving the table side-to-side, the motion of the lower mold halves 36 are dependent upon one another and cannot be independently controlled. This dependent motion means that any maintenance or repairs that need to be made to the vertical injection molding machine 10 or any change-out of the lower mold halves 36 requires the complete vertical injection molding machine 10 to be shut down. The present invention overcomes both of these drawbacks by (1) moving the lower mold halves 36 from the aligned position toward the front of the machine to the offset position and (2) providing independent control of the movement of the individual carrier members 50.

Moving the carrier members 50 and the attached lower mold halves 36 toward the front side 18 of the vertical injection molding machine 10 and at an angle to one another—as opposed to side-to-side movement—necessarily brings the offset positions horizontally closer to one another. Thus, the distance between offset positions is reduced thus reducing the distance that an operator must move horizontally. Using the present invention, the offset positions may be brought close enough to one another that the operator need not walk back and forth to access both of the offset positions and work on both of the lower mold halves 36. In the preferred embodiment, the distance between the offset positions is so small that the operator may remain stationary (and may even remain seated) and access both offset positions without moving horizontally. This reduces the time between injection cycles and the physical strain on the operator and increases throughput through the vertical injection molding machine 10. Additionally, moving the offset positions closer to one another allows the use of a single robot with the shuttle system 11 reducing the equipment cost.

Providing independent control of the carrier members 50 and moving the carrier members 50 independently of one another allows greater control of the process and permits one of the carrier members 50 to be stopped while the vertical injection molding machine 10 continues to function with the other carrier member 50. With one of the carrier members 50 stopped, any damage to the stopped carrier member 50 may be repaired and any required maintenance to that carrier member 50 may be performed. Additionally, when the time comes to change the mold 30, one of the carrier members 50 may be stopped and the lower mold half 36 changed while the other lower mold half 36 continues to form parts. In this way, the retooling time is reduced. Thus, by providing independent control of the carrier members 50, the downtime of the vertical injection molding machine 10 is reduced and the throughput is increased.

Many alternative embodiments that accomplish the same stated goals are possible and anticipated. For example, the vertical injection molding machine 10 may include more than two carrier members 50 and, thus, more than two lower mold halves 36. Likewise, each of the carrier members 50 may be adapted to receive more than one lower mold half 36 and have an aligned position for each of the lower mold halves 36. Further, the slots 57 may have a different shape directing the carrier members 50 along non-linear travel paths. Also, the actuating members 60 need not necessarily be hydraulic cylinders 62. Some of the possible alternative embodiments are discussed below.

Figure 5:
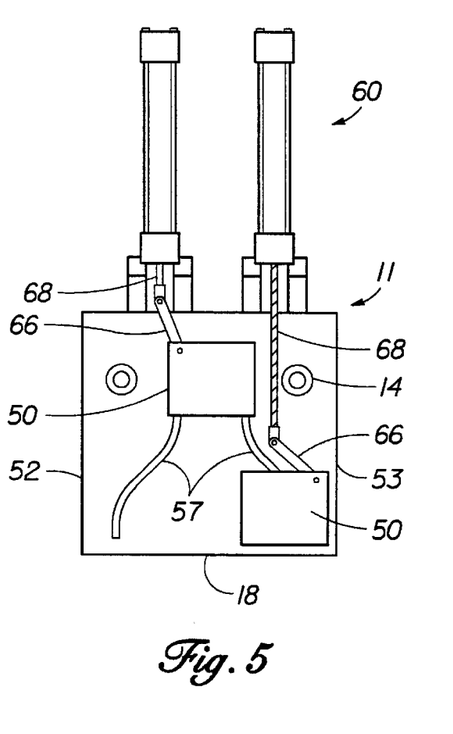
FIG. 5 is a partial top elevational view of the shuttle system showing an alternative embodiment using worm gears and an S-shaped travel path.

FIG. 5 shows one alternative embodiment wherein the actuating member 60 is a worm gear 68 driven by a motor. The worm gear 68 moves axially as the pinion, which is driven by the motor, turns. The worm gear 68 is connected to the carrier member 50 by a linkage 66 and moves the carrier member 50 between the aligned position and the offset position.

FIG. 5 also discloses an alternate slot 57 design and travel path for the carrier path. As shown in the figure, the slot 57 has an S-shape and therefore defines a travel path for the carrier member 50 that is nonlinear and arcuate. The S-shaped travel path is able to move the carrier members 50 toward the front side 18 of the vertical injection molding machine 10 when moving from the aligned position to the offset position.

Figure 6:
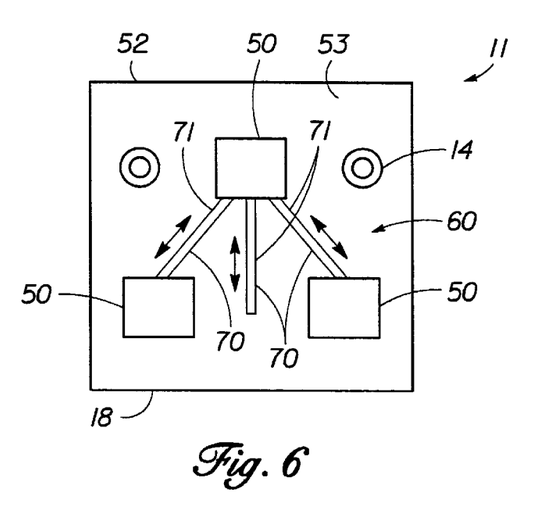
FIG. 6 is a partial top elevational view of an alternative embodiment of the shuttle system having three carrier members and using linear motors.

FIG. 6 shows a second alternative embodiment for the actuating member 60, namely a linear motor 70. Linear motors 70 operate on essentially the same principle as rotary induction motors. However, instead of a rotating magnetic field, the magnetic field sweeps across the flat motor face. The linear motor 70 has a stator 71 and a reaction plate 72. The stator 71 is typically a three phase winding in a laminated iron core. When energized from an AC power source a traveling wave magnetic field is produced. The reaction plate 72 is the equivalent of a rotor in a rotary induction motor and comprises a sheet of conductive material, often having a flat plate of backing material. The magnetic field produces a force that propels the reaction plate 72 linearly along the surface of the stator 71. Reversing two phases of the power supply reverses the direction of the magnetic wave and, thus, the reaction plate 72. Thus, a linear motor 70 may be used to move the carrier members 50. The stator 71 is affixed to the platform 52 and the reaction plate 72 is affixed to the carrier member 50.

Additionally, FIG. 6 shows a vertical injection molding machine 10 having three carrier members 50. Increasing the number of carrier members 50 may provide increased throughput.

Figures 7, 9:
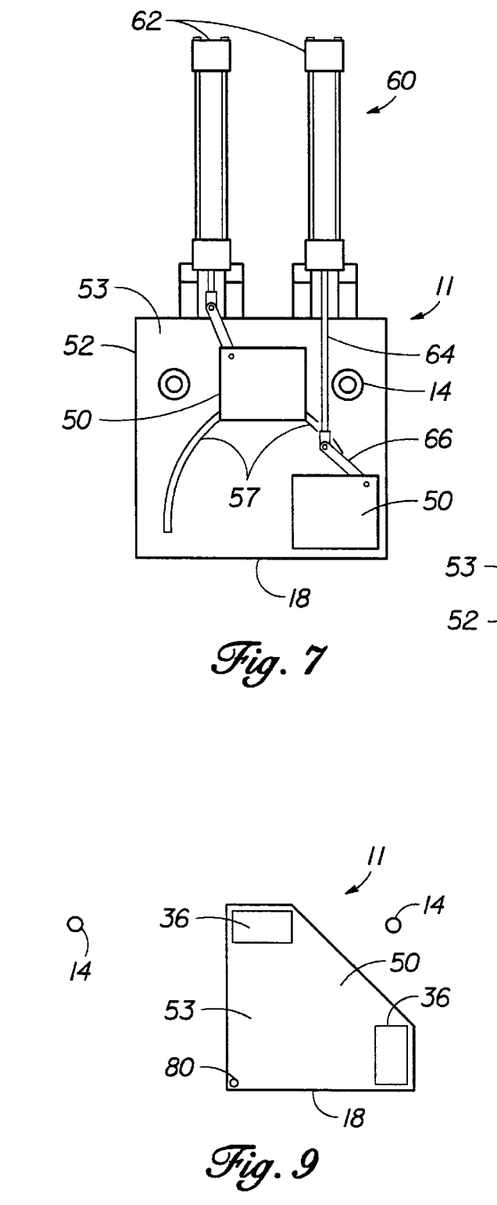
FIG. 7 is a partial top elevational view of an alternative embodiment of the shuttle system having curvilinear travel paths.
FIG. 9 is a partial top elevational view of an alternative embodiment of the shuttle system that uses a single carrier member.

A second alternative embodiment for the slot 57 shape and travel path is shown in FIG. 7. In this embodiment, the travel path is arcuate and curvilinear. By changing the travel path of the carrier member 50 to an arcuate path, the offset positions may be brought closer together as the arc creates additional clearance room.

Figure 8:
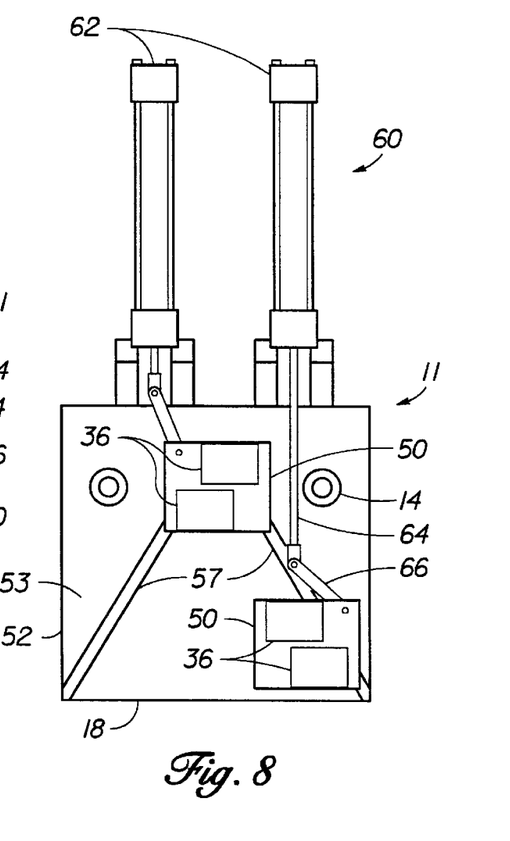
FIG. 8 is a partial top elevational view of an alternative embodiment of the shuttle system wherein the carrier members are each adapted to receive two lower mold halves thereon.

As mentioned each of the carrier members 50 may provide for attachment of more than one lower mold half 36 thereto as shown in FIG. 8. In such a shuttle system 11, the carrier member 50 moves from an offset position to a first aligned position wherein one of the lower mold halves 36 is aligned with the upper mold half 34 and then to a second aligned position wherein the second lower mold half 36 is aligned with the upper mold half 34. Then, the carrier member 50 moves to the offset position for ejection of the parts from both of the lower mold halves 36 attached thereto and for preparation of the lower mold halves 36 for the formation of the next parts.

Figure 10:
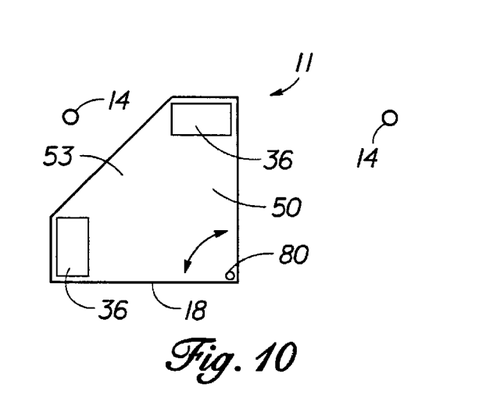
FIG. 10 is a partial top elevational view of the alternative embodiment of the shuttle system shown in FIG. 9 showing the carrier member rotated so that the other carrier member is in the aligned position.

FIGS. 9 and 10 show an alternative embodiment for the present invention that has only a single carrier member 50. Although this embodiment does not provide for independent control as the preferred embodiment does, this alternative embodiment does move the lower mold halves 36 toward the front end of the vertical injection molding machine 10. The carrier member 50 rotates about a pivot point 80, rocking back and forth to sequentially deliver the lower mold halves 36 to the aligned position. The carrier member 50 is pivotally mounted to the vertical injection molding machine 10 near the front side 18 of the vertical injection molding machine 10. The lower mold halves 36 are mounted to the carrier member 50 at positions offset from one another by about ninety degrees, although the exact angle may be any angle that moves the offset lower mold half 36 clear of the aligned position. In a first position, the carrier member 50 is positioned with one of the lower mold halves 36 located in the aligned position. The carrier member 50, driven by an actuating member 60 such as a stepper motor, rotates about the pivot point 80 until the other lower mold half 36 is positioned in the aligned position. When one lower mold half 36 is in the aligned position, the other is in the offset position. The rotation of the carrier member 50 moves the lower mold halves 36 along a curvilinear travel path that moves them toward the front side 18 of the vertical injection molding machine 10 as the lower mold halves 36 move from the aligned position to the offset position. The carrier member 50 does not rotate about 360 degrees, but rocks back and forth. Thus, the lower mold halves 36 follow different, separate travel paths.

While the foregoing is directed to the preferred embodiment of the present invention, other and further embodiments of the invention may be devised without departing from the basic scope thereof, and the scope thereof is determined by the claims which follow.

We claim:

1. A method for increasing the throughput of a vertical injection molding machine, the vertical injection molding machine comprising a platform and an injection assembly and a mold, an upper mold half of the mold aligned with the injection assembly for operable mating therewith and the upper mold half adapted for removable, operable mating with an aligned lower mold half of the mold, comprising the steps of:

attaching a first lower mold half to a first carrier member that is movably attached to the vertical injection molding machine by a detent of the carrier member mating with a corresponding slot formed in a flat upper surface of the platform, the slot defines a first travel path for the first lower mold half;

attaching a second lower mold half to a second carrier member that is movably attached to the vertical injection molding machine by a detent of the carrier member mating with a corresponding slot formed in the flat upper surface of the platform, the slot defines a second travel path for the second lower mold half;

moving the first carrier member along the first travel path to an aligned position, wherein the first lower mold half is aligned with the upper mold half for mating therewith;

clamping the upper mold half to the first lower mold half, injecting a material into the mold, and separating the mold;

moving the first carrier member back along the first travel path from the aligned position to an offset position removed from the aligned position;

moving the second carrier member, independent from the first carrier member, along the second travel path to the aligned position, the second travel path different from and not aligned with the first travel path; and clamping the upper mold half to the second lower mold half, injecting a material into the mold, and separating the mold.

2. A shuttle system apparatus for a vertical injection molding machine, the vertical injection molding machine comprising an injection assembly and a mold, an upper mold half of the mold aligned with the injection assembly for operable mating therewith and the upper mold half adapted for removable, operable mating with an aligned lower mold half of the mold, comprising:

a plurality of carrier members attached to the vertical injection molding machine, each of the plurality of carrier members adapted for receipt and attachment of a lower mold half of the mold thereto;

the plurality of carrier members selectively movable in a platform plane between an aligned position, wherein the lower mold half is aligned with the upper mold half, and an offset position removed from the aligned position;

the plurality of carrier members movable relative to one another in the platform plane;

a platform attached to the vertical injection molding machine and positioned below the upper mold half, the platform having a relatively flat upper surface;

the plurality of carrier members slidably attached to the upper surface of the platform;

the upper surface of the platform therein defining a slot associated with each of the plurality of carrier members;

a detent attached to each of the plurality of carrier members the detents sized and adapted to mate with the slots;

the detents and slots adapted to restrict the movement of the associated one of the plurality of carrier members to a predefined travel path; and each of the slots defining a travel path for the associated one of the plurality of carrier members.

3. The apparatus of claim 2, further comprising a control member in communication with the vertical injection molding machine adapted to independently control the motion of each of the plurality of carrier members.

4. The apparatus of claim 2, wherein the plurality of carrier members following different, independent travel paths that are not in the same vertical plane.

5. The apparatus of claim 2, wherein the plurality of carrier members following different, independent travel paths and cannot travel along the same vectors.

6. The apparatus of claim 2, wherein the plurality of carrier members following independent travel paths that are not aligned with one another.

7. The apparatus of claim 2, wherein the plurality of carrier members following independent linear travel paths that lie at an angle to one another.

8. The apparatus of claim 6, wherein the angle is less than 180 degrees.

9. The apparatus of claim 2, wherein the plurality of carrier members following different, independent non-linear travel paths.

10. The apparatus of claim 2, wherein the plurality of carrier members following different, independent arcuate travel paths.

11. The apparatus of claim 2, wherein the plurality of carrier members following different, independent curvilinear travel paths.

12. The apparatus of claim 11, wherein each of the independent curvilinear travel paths is S-shaped.

13. The apparatus of claim 2, wherein each of the plurality of carrier members is adapted for receipt and attachment of a plurality of lower mold halves thereto.

14. The apparatus of claim 2, wherein the detents and the slots are T-shaped.

15. The apparatus of claim 2, further comprising an actuating member attached to each of the plurality of carrier members, the actuating members adapted to move the plurality of carrier members between the aligned position and the offset position.

16. The apparatus of claim 15, wherein the actuating member is a hydraulic cylinder.

17. The apparatus of claim 15, wherein the actuating member is a pneumatic cylinder.

18. The apparatus of claim 16, further comprising:
the hydraulic cylinder having a movable ram; and
a linkage attached to the ram and the associated one of the plurality of carrier members.

19. The apparatus of claim 15, wherein the actuating member is a worm gear.

20. The apparatus of claim 15, wherein the actuating member is a linear motor.

21. A shuttle system apparatus for a vertical injection molding machine, the vertical injection molding machine having a front side comprising an injection assembly and a mold, an upper mold half of the mold aligned with the injection assembly for operable mating therewith and the upper mold half adapted for removable, operable mating with an aligned lower mold half of the mold, comprising:

a plurality of lower mold halves of the mold, each attached to one of one or more carrier members;

the one or more carrier members movably attached to the vertical injection molding machine;

each of the one or more carrier members adapted for receipt and attachment of at least one of the plurality of lower mold halves thereto;

each of the one or more carrier members adapted to selectively move the at least one of the plurality of lower mold halves attached thereto between an aligned position and an offset position, the offset position nearer the front side of the vertical injection molding machine than the aligned position;

the plurality of lower mold halves following noncircular travel paths;

a platform attached to the vertical injection molding machine and positioned below the upper mold half, the platform having a relatively flat upper surface;

the one or more carrier members slidably attached to the upper surface of the platform;

the upper surface of the platform therein defining a slot associated with each of the one or more carrier members;

a detent attached to each of the one or more carrier members, the detents sized and adapted to mate with the slots;

the detents and slots adapted to restrict the movement of the associated one of the one or more carrier members to a predefined travel path; and each of the slots defining a travel path for the associated one of the one or more carrier members.

22. The apparatus of claim 21, wherein each of the one or more carrier members adapted for receipt and attachment of a plurality of lower mold halves thereto.

23. The apparatus of claim 21, further comprising:

the vertical injection molding machine having one carrier member movably attached thereto;

the carrier member adapted for receipt and attachment of two of the lower mold halves of the mold thereto;

the carrier member adapted to alternately move each of the two lower mold halves between the aligned position and the offset position;

the offset position located nearer the front side of the vertical injection molding machine than the aligned position; and the lower mold halves following a curvilinear travel path.

24. A vertical injection molding machine, comprising:

a frame;

a material supply;

an injection assembly attached to the frame, the material supply in fluid communication with the injection assembly and adapted to supply material thereto;

an upper mold half attached to the injection assembly, the upper mold half defining an upper mold half cavity, the upper mold half cavity in fluid communication with the injection assembly;

a platform attached to the frame, the platform positioned below the upper mold half and having a relatively flat upper surface that defines a platform plane;

a plurality of carrier members slidably attached to the upper surface of the platform and movable relative to one another and relative to the platform;

the plurality of carrier members each adapted for receipt and attachment of a lower mold half thereto, each of the lower mold halves defining a lower mold half cavity;

the plurality of carrier members movable between an aligned position, wherein the lower mold half is aligned with the upper mold half, and an offset position removed from the aligned position;

the upper mold half selectively movable vertically between a raised position and a clamped position wherein the upper mold half abuts the lower mold half located in the aligned position;

so that the upper mold half and the lower mold half form a mold and the upper mold half cavity and the lower mold half cavity define a mold cavity in fluid communication with the injection assembly;

the upper surface of the platform therein defining a slot associated with each of the plurality of carrier members;

a detent attached to each of the plurality of carrier members, the detents sized and adapted to mate with the slots;

the detents and slots adapted to restrict the movement of the associated one of the plurality of carrier members to a predefined travel path; and each of the slots defining a travel path for the associated one of the plurality of carrier members.

* * * * *